INVENTORS
Roger Chabassier
Gérard Dupuy
Bernard Lerouge
Jean Megret
BY Bacon & Thomas ATTORNEYS

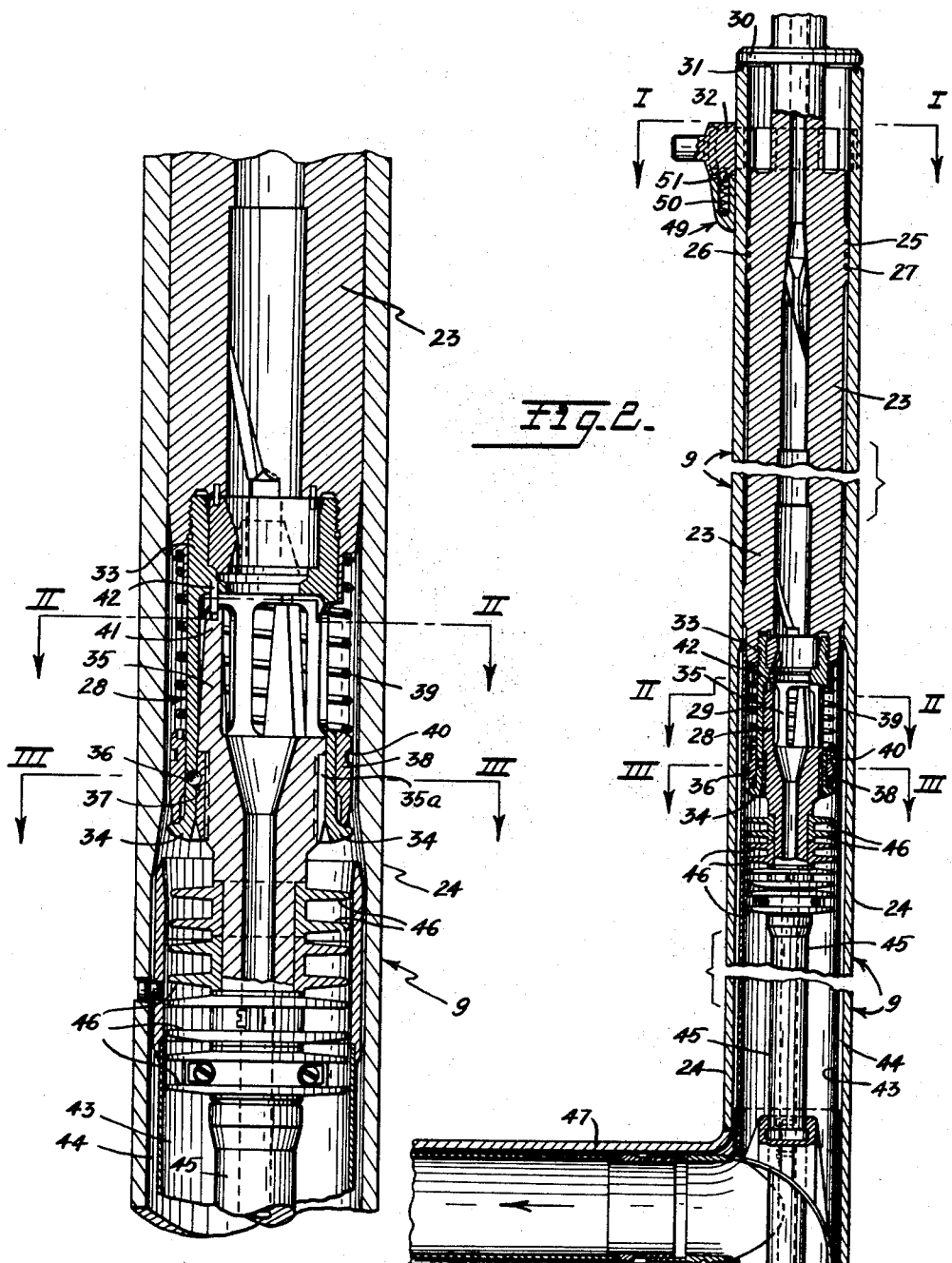

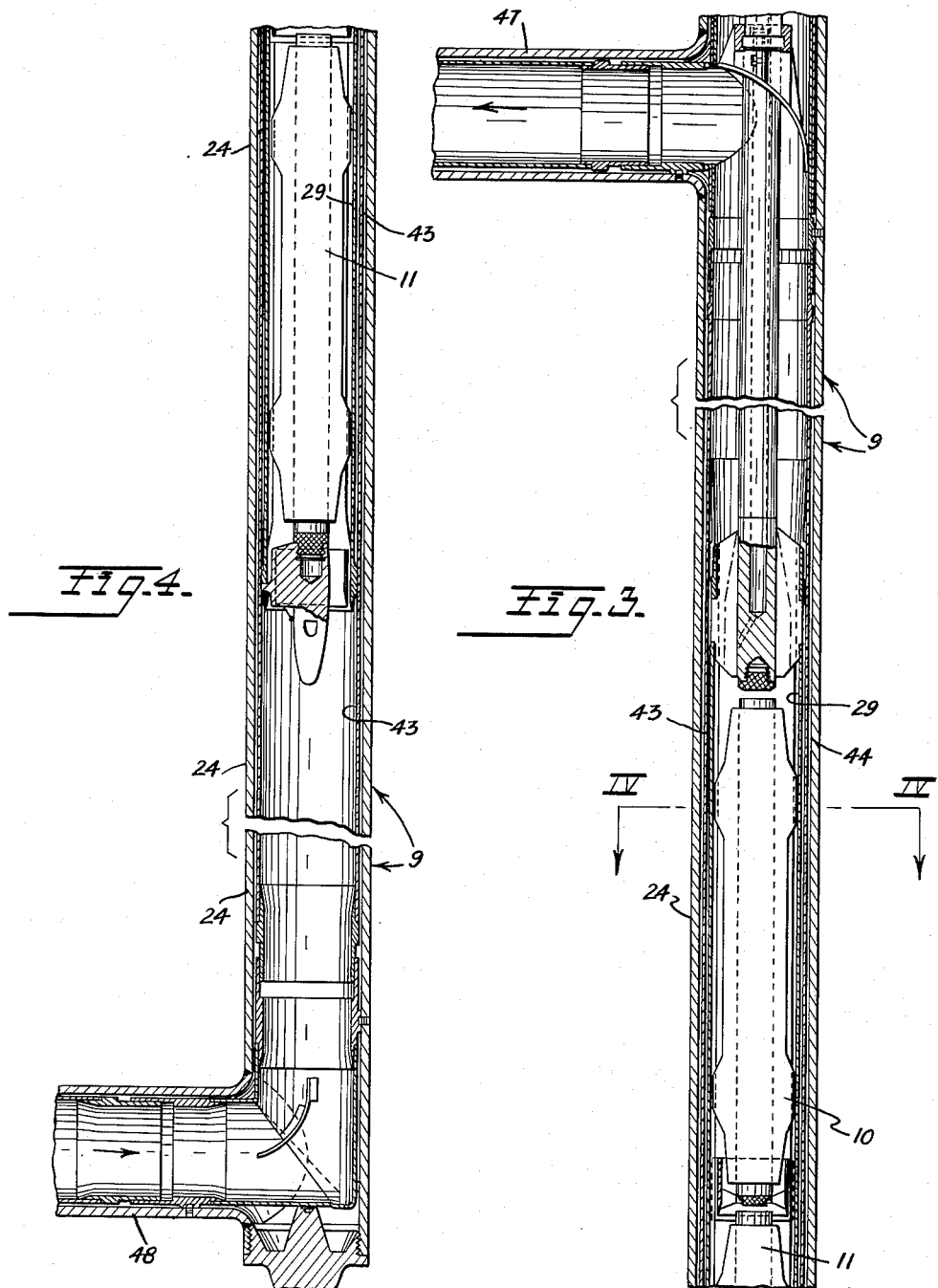

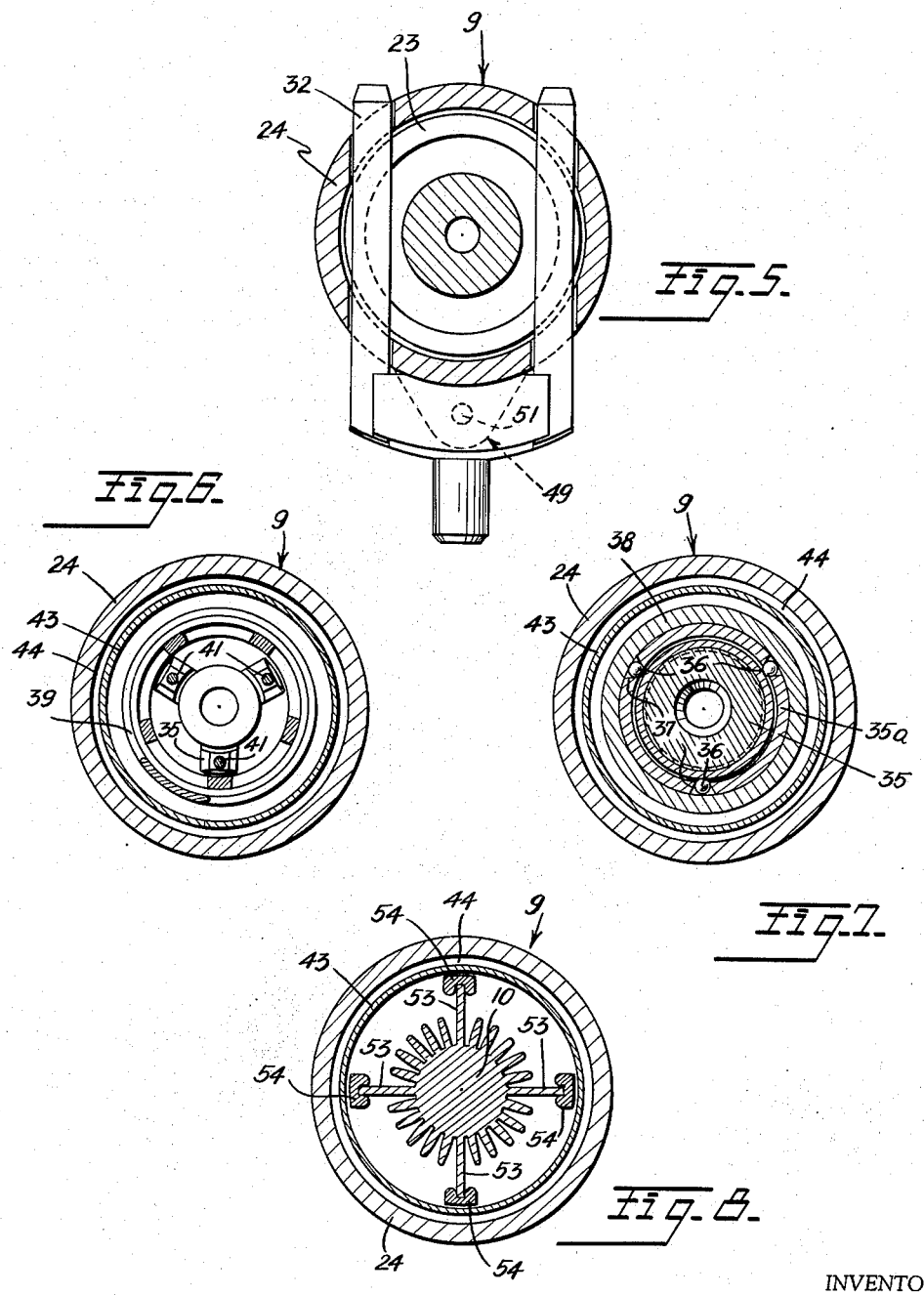

United States Patent Office 3,144,392
Patented Aug. 11, 1964

3,144,392
SELF-CONTAINED LOOP FOR STUDYING MATERIALS UNDER IRRADIATION IN A SWIMMING POOL REACTOR
Roger Chabassier, 135 Blvd. Bineau, Neuilly-sur-Seine, France; Gerard Dupuy, 2 bis Square Henry Pate, Paris, France; Bernard Lerouge, 9 Ave. Gambetta, Saint-Germain-en-Laye, France; and Jean Megret, 286 Rue d'Epinay, Argenteuil, France
Filed May 8, 1961, Ser. No. 108,434
Claims priority, application France May 20, 1960
15 Claims. (Cl. 176—12)

Development in the nuclear industry results in the need for easily accessible sources of radiation for studying the behaviour of certain materials under irradiation.

To this end, some swimming-pool reactors have been constructed wherein there is especially easy access to the region of the core. In particular, a reactor of this type has been constructed wherein the core and its related members are situated at the centre of the bath in an assembly called the "pile unit."

In such a reactor, there are self-contained loops around the pile unit, and the materials to be studied under irradiation are disposed under special conditions in the loops. The irradiation is given off by the pile unit, which primarily contains the elements of fissile material and the control rods.

In the field of special reactors for studying and testing materials, a loop is an assembly comprising above all a main duct which may or may not define a closed circuit, which is exposed in one of its regions to an irradiation flux, and which contains in this region the material or member which is being subjected to the irradiation test, the said duct being equipped with means enabling a fluid to be circulated over the said material or member under given conditions of temperature and pressure. When the loop is of the self-contained and detachable type, as in the case of the present invention, the term "loop" often covers not only the duct in question, but also the related members as a whole which are intended to support it and adjust its position.

Such self-contained loops must comprise chiefly a test duct in which the materials to be studied are placed, and devices for setting up a cooling-gas circuit for the irradiated materials in the duct. Furthermore, it must be easy to carry out the operations of handling the materials to be irradiated (placing them in position in the test duct or unloading).

In addition, the loops must be supported at points near the core, and they must be movable and be rigid in their entirety in order to facilitate placing them accurately in position around the core.

The present invention relates to a self-contained loop for studying materials under irradiation in a swimming-pool reactor which complies particularly well with the requirements enumerated above.

In particular, the invention enables samples of given materials, such as fuel elements, to be subjected to irradiation in a definite ambient medium, for example in an atmosphere of carbon dioxide, at a definite pressure. The gas, circulating in a closed circuit, cools the samples, and is itself cooled in a natural- or forced-circulation heat-exchanger.

The invention provides a self-contained loop for studying materials under irradiation in a swimming-pool reactor, characterised in that it comprises a cooling circuit incorporating a test duct, a structure supporting the said cooling circuit, a supporting assembly, means secured on the one hand with the structure and on the other hand with the supporting assembly in order to enable the said structure to be displaced with respect to the said assembly, and a fine-adjustment device for placing the test duct in position against the core of the reactor by controlling displacements of the structure with respect to the supporting assembly.

A heat-exchanger included in the cooling circuit is normally one of two different types: either an exchanger comprising a nest of tubes in which the cooling water circulates under the action of an auxiliary pump, or an exchanger made up of needles disposed in parallel relation and cooled by natural convection of the water in the bath.

In accordance with one feature of an embodiment of the invention, the test duct has a plug at the top to which a fluid-tight seal is imparted by packings, and the said plug, from which is suspended a basket in which the elements to be irradiated are placed, rests on the one hand on the walls of the test duct by way of a shoulder made in one piece with the latter, and on the other hand on a fork passing through the walls of the said duct above the packing and the said plug, and along two parallel chords.

In accordance with another feature of an embodiment of the invention, the means for rapidly dismantling the test duct consist of a complex mechanical assembly essentially comprising:

A first assembly secured to the plug, comprising a first tubular sleeve fixed to the plug at one end and terminating in a broadened portion at the other end;

A second assembly secured to the basket, essentially comprising a second tubular sleeve whereof the external diameter is slightly less than the internal diameter of the first sleeve;

Means for connecting the first assembly with the second assembly, consisting of a system of three balls disposed at 120° radially with respect to one another and held, with a certain degree of play, in the walls of the first sleeve, the said balls being capable of taking up a position in corresponding spherical recesses provided for this purpose in the walls of the second sleeve;

A third sleeve surrounding the first sleeve and secured to a spring which has its opposite end fixed to the plug. This third sleeve abuts under the action of the foregoing spring against the broadened portion of the first sleeve, thus bringing the balls into position in their respective recesses;

Two abutments fixed to the second sleeve at the one of its ends which is not fixed to the basket, the said abutments ensuring that the spherical recesses are correctly registered with the balls.

The basket in which are disposed the fuel elements to be studied may be made up of four U-shaped bars in cross formation, the concave portion being disposed towards the center. The sheaths of the fuel elements include four fins regularly disposed in cross formation, and accommodated in the U-shaped struts.

The pipes in which the cooling gas circulates may consist of two co-axial tubes with an annular space between them. A fluid, of the same nature as the cooling fluid for example, is trapped in this space in order to give heat-insulation between the water in the bath and the cooling fluid in the loop.

In order that the invention may be clearly understood, embodiments thereof will now be described by way of example only with reference to the accompanying diagrammatic FIGURES 1 to 9, in which:

FIGURE 2 is a sectioned view of a first portion of a test duct of a self-contained loop;

FIGURE 3 is a sectioned view of a second portion of the test duct of a self-contained loop;

FIGURE 4 is a sectioned view of a third portion of a test duct of a self-contained loop;

FIGURE 5 is a sectioned view of the test duct along I—I in FIGURE 2;

FIGURE 6 is a sectioned view of the test duct along II—II in FIGURE 2;

FIGURE 7 is a sectioned view of the test duct along III—III in FIGURE 2;

FIGURE 8 is a sectioned view of the test duct along IV—IV in FIGURE 3;

FIGURE 9 is a detailed view of the plug-basket locking system illustrated in FIGURE 2.

Figure 1:
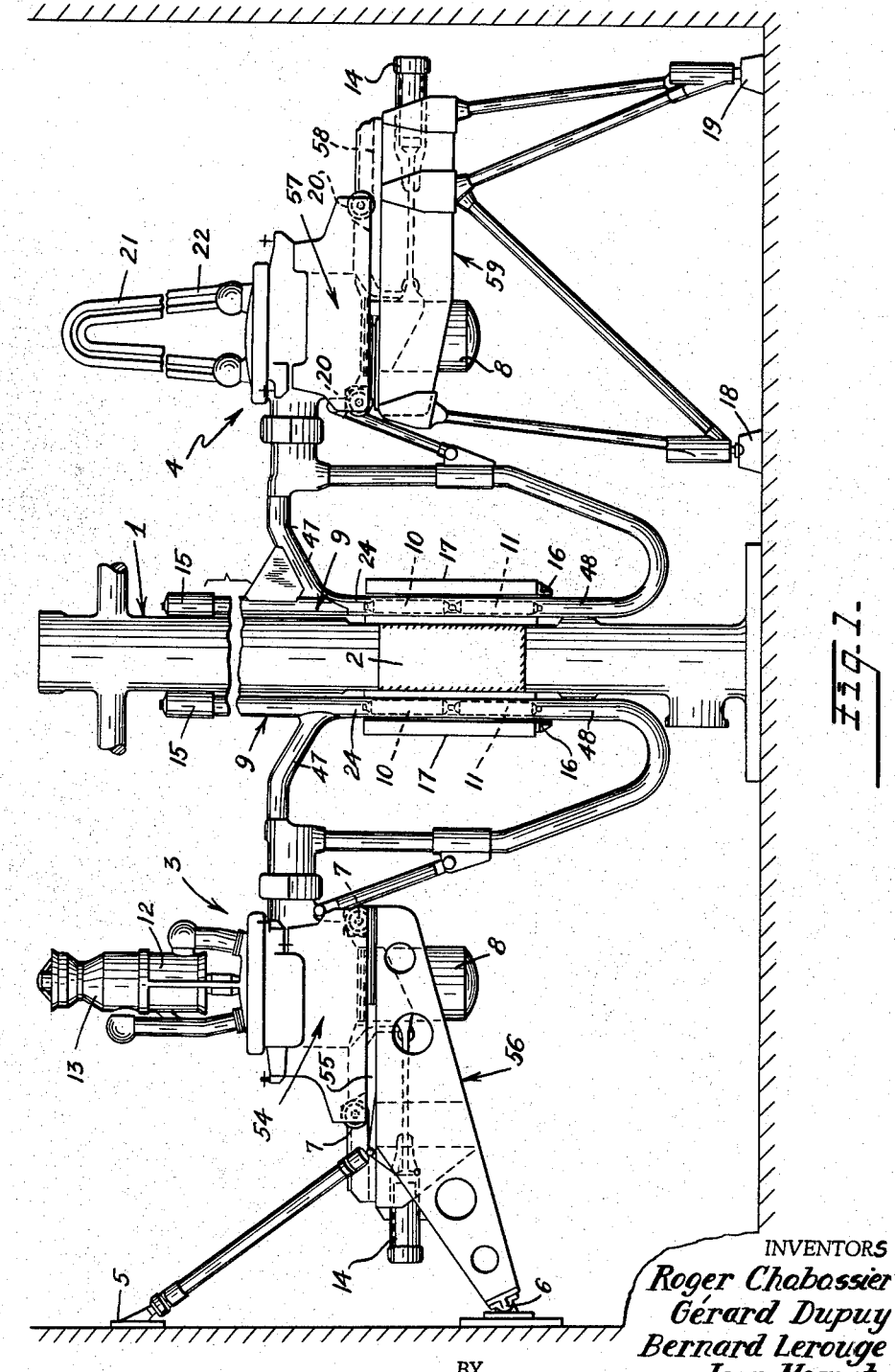
FIGURE 1 is a front view showing, on either side of the axis, two forms of embodiment of the self-contained loop disposed round a pile unit of a swimming-pool reactor.

FIGURE 1 illustrates a pile unit 1 showing the outline of the core 2. On either side of the pile unit may be seen two self-contained loops 3 and 4 in two forms of embodiment of the invention.

In one form of embodiment of the invention, the loop 3 comprises a cooling circuit supported by a structure 54 which can be moved on a supporting assembly 56, or bracket, the latter being fixed at 5 and 6 to the vertical wall of the pool.

Movements of the structure 54 with respect to the supporting assembly 56 are controlled from outside the pool by a fine-adjustment device for placing the loop in position against the core 2, for example with the aid of a jack 14. Moreover, there are rollers 7 on the structure 54 and a running track 55 on the supporting assembly to enable the structure 54 to be moved longitudinally with respect to the supporting assembly 56.

The motor-blower unit 8 may also be seen; this unit sets the gas circulating in the cooling circuit which essentially comprises a test duct 9 in which are disposed the two fuel elements 10 and 11 on the same level as the core 2 of the pile unit. The heat exchanger which also forms part of the cooling circuit is indexed by the reference 12, and includes an auxiliary pump 13. On the test duct 9 may be seen the plug 15, and the base 16 of the beryllium reflector 17. In another form of embodiment of the invention, the loop 4, also illustrated in FIGURE 1, comprises a test duct 9, a plug 15, a support 16 for a beryllium reflector 17 associated with the fuel elements 10 and 11 disposed on the same level as the core 2 of the pile unit.

In this form of embodiment, the cooling circuit is supported by a structure 57 which can move on a supporting assembly 59 fixed at 18 and 19 to the base of the pool. As in the foregoing form of embodiment, rollers 20 and a running track 58 enable the structure 57 to be displaced with respect to the supporting assembly 59. Like the foregoing one, this loop furthermore comprises a motor-blower unit 8 and a jack 14. One of the essential differences between the loop 4 and the loop 3 previously described resides in the fact that the exchanger 21 consists of tubes such as 22 disposed in parallel relation and cooled by natural convection of the water in the pool.

FIGURES 2, 3 and 4 illustrate a longitudinal section through the test duct 9. On the first portion illustrated in FIGURE 2 may be seen the plug 23. A fluid-tight seal between the said plug 23 and the tubes 24 of the test duct 9 is provided by three packings 25, 26 and 27. The said plug supports the device 28 which locks a basket 29 to the plug 23. The said plug is held on the one hand by a shoulder 30 which rests on the tube 24 by way of a packing 31, and on the other hand by a fork 32 (FIGURE 5) which passes though the tube 24 and the plug 23 along two parallel chords. The locking device 28 (FIGURE 9) comprises a first sleeve 33 connected to the plug 23 at one end, and terminates at the other end in a broadened portion 34.

A second sleeve 35 whose external diameter is slightly less than the internal diameter of the sleeve 33 is connected to the basket 29. In the first sleeve 33 there are three balls 36 which connect the sleeve 35 with the sleeve 33 when they are brought to bear in spherical recesses 37 in a casing 35a fastened on the sleeve 35. The balls 36 are brought to bear inwardly against recesses 37 by virtue of a third sleeve 38, which abuts under the thrust of a spring 39 against the broadened portion 34 of the sleeve 33, and in this position brings the balls 36 to bear inwardly against the recesses 37.

To unfasten the plug 23 from the basket 29, an operation generally carried out in a hot laboratory, it is sufficient to displace the sleeve 38, compressing the spring 39 by virtue of the annular notch 40 provided for this purpose in the sleeve 38 until a position is reached in which the sleeve 38 no longer exerts any pressure on the balls. The latter, no longer being brought to bear in their recesses 37, thus enable the plug 23 to be unfastened from the basket 29.

For re-assembly, it is important to position the recesses 37 opopsite the balls 36, and for this purpose the sleeve 35 comprises two abutments 41, only one of which is visible in FIGURE 9, and the sleeve 33 comprises orifices 42 to accommodate the said abutments. It is then sufficient to rotate the plug 23 with respect to the basket 29 until the abutments 41 drop into the orifices 42, and at this point the balls 36 are disposed in registry with the orifices 37.

FIGURES 2 to 8, and more particularly FIGURES 5, 6, 7 and 8, reveal that the pipes in which the cooling gas circulates consist of two concentric tubes 24 and 43 with an annular space 44 between them. A fluid of the same nature as the cooling fluid, for example, is trapped in this space 44 in order to give heat-insulation between the water in the bath and the cooling fluid in the loop.

FIGURE 2 shows the end 45 of the basket 29 to which are fitted plates such as 46 to set up a zone of stagnant gases, thus preventing excessively hot gases from reaching the packings 25, 26 and 27, which would damage them.

FIGURE 2 also shows the outlet pipe 47 for the gas circulating in the test duct 9.

FIGURES 3 and 4 show the position of the materials to be studied 10 and 11 in the test duct. FIGURE 4 also shows the inlet pipe 48 for the cooling gas.

Outside the test duct (FIGURE 2) may be seen a device 49 which consists of a spring 50 and a ball 51, and serves to lock the fork 32 when it is supporting the plug 23.

FIGURES 5 to 8 show the external tube of the test duct 24, the internal tube 43 of the said test duct, and the annular space 44 between these two tubes in which is trapped the fluid giving heat-insulation.

FIGURE 6, which is a section along II—II of FIGURE 2, also shows the spring 39, the sleeve 35 and the abutments 41.

FIGURE 7, which is a section along III—III in FIGURE 2, more particularly shows the sleeve 38 and the sleeve 34 comprising the balls 36 and their recesses 37 in the casing 35a of the sleeve 35.

FIGURE 8, which is a section along IV—IV in FIGURE 3, shows a fuel element 10 with its cooling fins 52 and its four fins 53 of larger dimensions. The basket 29 is made up of four U-shaped struts 54 in cross formation which hold the four fins 53 of the fuel element 10.

This invention is naturally not limited to the forms of embodiment described and illustrated, which have been given only by way of example.

We claim:

1. In a test loop for studying a sample under irradiation in a swimming-pool reactor, duct means defining a closed circuit and including a test duct portion, means for supporting a sample in said duct, means for circulating a cooling gas in said circuit, a supporting frame secured to said duct means and supporting the same, a stationary structure connected to a wall of said reactor, said supporting frame being mounted on said stationary structure for longitudinal movement with respect thereto, and control means for moving said supporting frame longitudinally with respect to said supporting structure, toward and away from the core of said reactor to adjust the position of said test duct portion with respect thereto.

2. A test loop according to claim 1, wherein the cooling circuit comprises a motor-blower unit, a heat-insulated test duct, means for rapidly dismantling the said test duct, a heat exchanger, a reflector and a reflector-support disposed externally on the said test duct.

3. A test loop in accordance with claim 1 wherein said closed circuit includes a circuit for detecting the radioactivity prevailing therein, means for measuring said radioactivity and means for connecting said detecting circuit and said closed circuit.

4. A test loop in accordance with claim 1 wherein the means which enable said supporting structure to be moved longitudinally with respect to said supporting assembly comprises rollers fixed on said supporting structure and a running track mounted on said supporting assembly.

5. A test loop in accordance with claim 1 wherein said control means includes a hydraulic jack for placing the test duct in position against the core of said reactor.

6. A test loop in accordance with claim 1 wherein mechanical control means are provided for longitudinal movement of said supporting frame.

7. A test loop in accordance with claim 4 wherein said running track is carried by an adjustable bracket fixed to a vertical wall of the reactor.

8. A test loop in accordance with claim 4 wherein said running track is carried by an adjustable support fixed to the base of the pool.

9. A test loop in accordance with claim 2 wherein the heat-exchanger consists of a nest of tubes with forced circulation of the cooling water under the action of a pump.

10. A test loop in accordance with claim 2 wherein the heat-exchanger comprises tubular elements in which the water circulates by natural convection.

11. A test loop in accordance with claim 2 wherein a pipe is disposed in concentric relation around at least one portion of said ducts and heat-insulation is provided by fluid disposed in the space between said pipe and said ducts.

12. A test loop in accordance with claim 2, wherein said sample is mounted in a basket which is secured to a plug disposed in the test duct.

13. A test loop in accordance with claim 12 wherein the basket consists of four radially directed U-shaped guide members located at evenly spaced angular intervals about the axis of said basket.

14. A test loop in accordance with claim 12 wherein the basket is secured to said plug by a releasable lock.

15. A test loop in accordance with claim 14 wherein said releasable lock comprises a first sleeve secured to said plug, a second sleeve mounted in concentric spaced relation with respect to said first sleeve, said second sleeve being connected to said basket and having three openings provided therein spaced 120° apart, said first sleeve having grooves adapted to register with said openings, three balls mounted in said openings, and a third sleeve mounted in telescopic relation with respect to said second sleeve and spring-biased into wedging relation with respect to said balls to urge said balls into said grooves.

References Cited in the file of this patent

UNITED STATES PATENTS

| | | |
|---|---|---|
| 2,744,064 | Moore | May 1, 1956 |
| 2,781,309 | Levinger et al. | Feb. 12, 1957 |
| 2,810,689 | Wigner et al. | Oct. 22, 1957 |
| 2,837,477 | Fermi et al. | June 3, 1958 |
| 2,921,007 | Spinrad | Jan. 12, 1960 |
| 2,937,127 | Flora | May 17, 1960 |
| 2,986,510 | Wigner et al. | May 30, 1961 |

FOREIGN PATENTS

| | | |
|---|---|---|
| 611,879 | Canada | Jan. 3, 1961 |